Oct. 2, 1923.
A. H. CANDEE
1,469,210
MOTOR CONTROL SYSTEM.
Filed Nov. 29, 1920
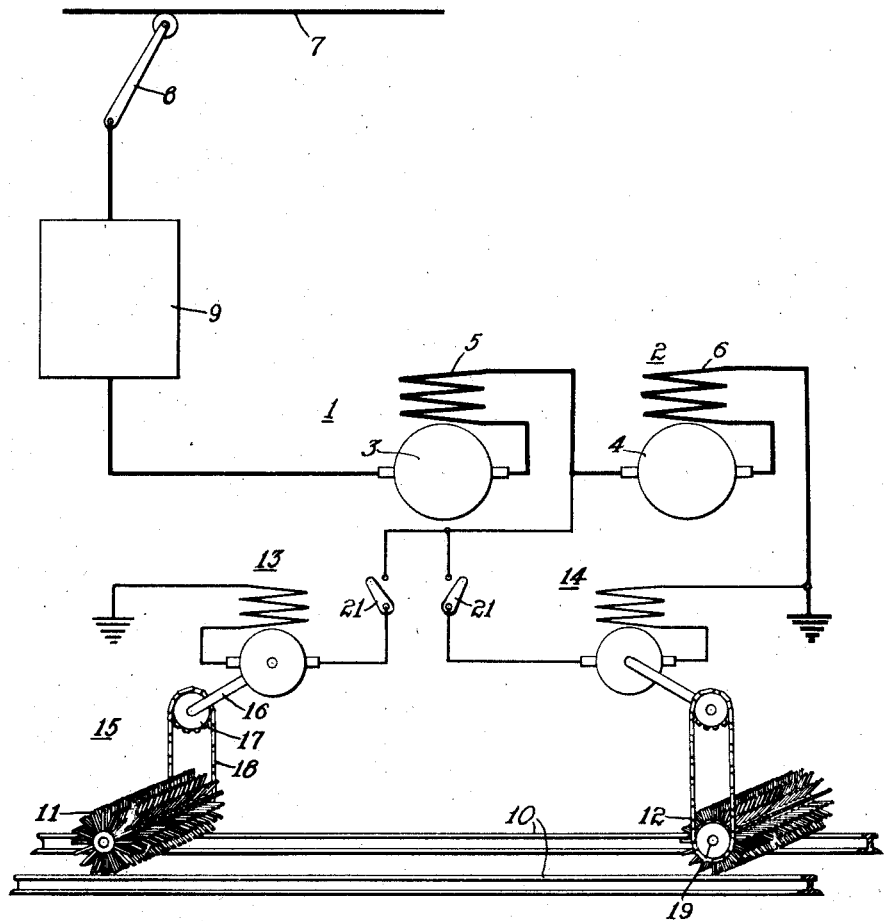
WITNESSES:
H. T. Shelhamer
H. C. Lowe
INVENTOR
Andrew H. Candee
BY
Wesley G. Carr
ATTORNEY Patented Oct. 2, 1923.

1,469,210

UNITED STATES PATENT OFFICE.

ANDREW H. CANDEE, OF FOREST HILLS, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed November 29, 1920. Serial No. 426,928.

*To all whom it may concern:*

Be it known that I, ANDREW H. CANDEE, a citizen of the United States, and a resident of Forest Hills, in the county of Allegheny and State of Pennsylvania, have invented a new and useful Improvement in Motor-Control Systems, of which the following is a specification.

My invention relates to motor-control systems and it has particular relation to control systems for motors which operate brooms of snow-sweepers.

The object of my invention is to provide means for effectively operating motors which actuate brooms of a snow-sweeper and to reduce the wear upon the brooms by rendering them inoperative when the sweeper is stationary.

For a better understanding of my invention, reference may be made to the accompanying drawing, the single figure of which is a schematic view of a motor-control system embodying my invention.

A plurality of main or car-propelling motors 1 and 2, having armatures 3 and 4 and series field-magnet windings 5 and 6, respectively, are energized from a source of electrical energy, such as a trolley 7, through trolley pole 8 and any suitable controller 9. Because of the high potential of the trolley 7, the motors 1 and 2 are connected permanently in series relation with each other.

The motors 1 and 2 operate a snow-sweeper vehicle and are mounted upon its forward and rear trucks (not shown), respectively. Snow brooms 11 and 12 are also mounted upon the forward and rear trucks of the sweeper, in accordance with customary practice, and are adapted to sweep the snow from the tracks 10 upon which the sweeper operates.

Auxiliary or broom motors 13 and 14 actuate brooms 11 and 12, respectively, by means of suitable mechanism 15. Each driving mechanism 15 may comprise a shaft 16, which is mechanically connected to the one or the other of the motors 13 and 14, a sprocket-wheel 17, which is securely mounted on the shaft to actuate a sprocket chain 18, and a sprocket-wheel 19 which is secured to the broom corresponding to the motor by which the chain 18 is driven.

A plurality of manually operable switches 21 are provided for connecting the broom motors 13 and 14 in parallel relation to the main motor 2 and to enable an operator to disconnect either or both of the auxiliary motors 13 and 14 from the control system.

It is apparent that when the main or propelling motors 1 and 2 are de-energized, the motors 13 and 14 are likewise de-energized and inoperative. By having the motors 13 and 14 connected in parallel relation to only one of the main motors 1 and 2, only one half of the total line voltage or of the voltage across both the main motors 1 and 12 is impressed upon the auxiliary motors 13 and 14. This is very advantageous, as the small motors operate better at a lower voltage than at line voltage, and a resistor or other voltage-reducing device is not required. For example, if the main motors are operating in series relation at 1,200 volts potential, the difference in potential across the terminals of each broom motor will be approximately 600 volts, which is the proper voltage to be impressed upon each of them as well as upon each of the main motors 1 and 2, all of the motors being preferably of the standard 600-volt type.

It is also advantageous to have the brooms automatically become inoperative when the motors of the snow-sweeper are not running, as a maximum saving of power is effected and wear of the auxiliary motors and brooms is greatly lessened.

While I have shown my invention in a preferred form, it is apparent that minor modifications may be made in the arrangement of apparatus and circuits without departing from the spirit thereof. I desire, therefore, to be limited only by the scope of the appended claims.

I claim as my invention:

1. In a motor-control system, the combination with a plurality of main motors connected in series relation, of an auxiliary motor connected in parallel relation with one of said motors.

2. In a motor-control system, the combination with a plurality of main motors connected in series relation, of a load device, and an auxiliary motor for operating said device, said auxiliary motor being connected in parallel relation to one of said main motors.

3. In a vehicle-motor-control system, the combination with a relatively high voltage supply circuit, of a plurality of low-voltage vehicle-propelling motors connected in permanent series relation across said supply circuit, and a plurality of low-voltage auxiliary motors connected across the same one of said prepelling motors.

4. In a vehicle-motor-control system, the combination with a relatively high-voltage supply circuit, of a plurality of low-voltage vehicle-propelling motors connected in permanent series relation across said supply circuit, a plurality of low-voltage auxiliary motors connected across the same one of said propelling motors, and means for rendering either of said auxiliary motors inoperative independently of said propelling motors.

In testimony whereof, I have hereunto subscribed my name this 12th day of November 1920.

ANDREW H. CANDEE.